US008076906B2

United States Patent
Chow et al.

(10) Patent No.: US 8,076,906 B2
(45) Date of Patent: Dec. 13, 2011

(54) BATTERY SYSTEM CONFIGURED TO SURVIVE FAILURE OF ONE OR MORE BATTERIES

(75) Inventors: Lu Chow, San Gabriel, CA (US); Taison Tan, Pasadena, CA (US); Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 0 days.

(21) Appl. No.: 12/462,070

(22) Filed: Jul. 28, 2009
(Under 37 CFR 1.47)

(65) Prior Publication Data
US 2010/0117599 A1    May 13, 2010

Related U.S. Application Data

(63) Continuation of application No. 11/501,095, filed on Aug. 8, 2006, now Pat. No. 7,573,233.

(60) Provisional application No. 60/740,150, filed on Nov. 28, 2005.

(51) Int. Cl.
*H02J 7/00* (2006.01)
*H02J 7/04* (2006.01)

(52) U.S. Cl. ........ 320/135; 320/136; 320/134; 320/126; 320/116; 320/117

(58) Field of Classification Search .................. 320/116, 320/117, 121, 134, 126, 135, 136, 137, 138, 320/130
See application file for complete search history.

(56) References Cited

U.S. PATENT DOCUMENTS

| | | | |
|---|---|---|---|
| 2,901,526 A | 8/1959 | Alton et al. | |
| 3,769,095 A | 10/1973 | Schmidt | |
| 4,957,829 A | 9/1990 | Holl | |
| 5,017,441 A | 5/1991 | Linder | |
| 5,140,744 A | 8/1992 | Miller | |
| 5,302,110 A | 4/1994 | Desai et al. | |
| 5,378,555 A | 1/1995 | Waters et al. | |
| 5,437,939 A | 8/1995 | Beckley | |
| 5,504,415 A | 4/1996 | Podrazhansky et al. | |
| 5,516,603 A | 5/1996 | Holcombe | |
| 5,534,765 A | 7/1996 | Kreisinger et al. | |
| 5,596,567 A | 1/1997 | deMuro et al. | |
| 5,639,571 A | 6/1997 | Waters et al. | |
| 5,641,587 A | 6/1997 | Mitchell et al. | |
| 5,652,499 A * | 7/1997 | Morita et al. | 320/112 |
| 5,709,280 A | 1/1998 | Beckley et al. | |
| 5,736,272 A | 4/1998 | Veenstra et al. | |
| 5,851,695 A | 12/1998 | Misra et al. | |
| 6,002,240 A | 12/1999 | McMahan et al. | |
| 6,060,864 A * | 5/2000 | Ito et al. | 320/136 |
| 6,268,710 B1 * | 7/2001 | Koga | 320/116 |
| 6,373,222 B2 | 4/2002 | Odaohhara | |
| 6,456,043 B1 * | 9/2002 | Finger | 320/134 |
| 6,462,551 B1 | 10/2002 | Coates et al. | |

(Continued)

*Primary Examiner* — Edward Tso
*Assistant Examiner* — Alexis Boateng
(74) *Attorney, Agent, or Firm* — Gavrilovich, Dodd & Lindsey, LLP

(57) ABSTRACT

The battery system includes a battery pack having a plurality of power sources arranged in parallel groups that are connected in series. Each parallel group includes a plurality of power sources connected in parallel. Each power source includes a battery. The system also includes electronics configured to repeatedly charge the battery pack according to a charging protocol. The charging protocol is configured such that the voltage of any one battery in the battery pack does not exceed its maximum operational voltage after failure of a battery in the battery pack.

17 Claims, 5 Drawing Sheets

U.S. PATENT DOCUMENTS

| | | |
|---|---|---|
| 6,465,986 B1 | 10/2002 | Haba |
| 6,469,471 B1 * | 10/2002 | Anbuky et al. ............... 320/118 |
| 6,524,739 B1 | 2/2003 | Iwaizono et al. |
| 6,565,986 B2 | 5/2003 | Itoh |
| 6,586,132 B1 | 7/2003 | Fukuda et al. |
| 6,639,408 B2 | 10/2003 | Yudahira et al. |
| 6,771,044 B1 * | 8/2004 | Vinciguerra et al. ......... 320/116 |
| 6,781,343 B1 | 8/2004 | Demachi et al. |
| 6,977,482 B2 * | 12/2005 | Popescu-Stanesti et al. . 320/116 |
| 6,980,859 B2 | 12/2005 | Powers et al. |
| 2002/0183801 A1 | 12/2002 | Howard et al. |
| 2003/0129457 A1 | 7/2003 | Kawai et al. |
| 2003/0186116 A1 | 10/2003 | Tanjou |
| 2004/0018419 A1 | 1/2004 | Sugimoto et al. |
| 2004/0058233 A1 | 3/2004 | Hamada et al. |
| 2004/0095098 A1 | 5/2004 | Turner et al. |
| 2004/0096713 A1 | 5/2004 | Ballantine et al. |
| 2004/0119444 A1 * | 6/2004 | Faure et al. ................... 320/134 |
| 2004/0201365 A1 | 10/2004 | Dasgupta et al. |
| 2004/0253512 A1 | 12/2004 | Watanabe et al. |
| 2006/0001403 A1 * | 1/2006 | Yudahira ...................... 320/134 |
| 2006/0076923 A1 * | 4/2006 | Eaves ............................ 320/112 |
| 2006/0192529 A1 * | 8/2006 | Kimura et al. ................ 320/116 |
| 2006/0208692 A1 | 9/2006 | Kejha |
| 2007/0029124 A1 | 2/2007 | DasGupta et al. |
| 2007/0188148 A1 * | 8/2007 | Kawasumi et al. ........... 320/134 |

* cited by examiner

BATTERY SYSTEM CONFIGURED TO SURVIVE FAILURE OF ONE OR MORE BATTERIES

RELATED APPLICATIONS

This Application is a continuation of U.S. patent application Ser. No. 11/501,095, filed on Aug. 8, 2006 now U.S. Pat. No. 7,573,233, entitled "Battery System Configured to Survive Failure of One or More Batteries;" which claims the benefit of U.S. Provisional Patent Application Ser. No. 60/740,150, filed on Nov. 28, 2005, entitled "Battery System Configured to Survive Failure of One or More Batteries;" each of which is incorporated herein in its entirety.

FIELD

The present invention relates to electrochemical devices and more particularly to battery packs.

BACKGROUND

Rechargeable battery packs have been proposed, however, one or more of the batteries in these battery packs can fail. For instance, one or more of the batteries can experience an internal failure such as a short, can trigger a safety device such as a burst disc and/or can become electrically disconnected from the other batteries. Recharging a battery pack after failure of a battery can increase the voltage one or more of the remaining batteries above its maximum operational voltage. Additionally, discharging a battery pack after failure of a battery can decrease the voltage one or more of the remaining batteries below its minimum operational voltage. Accordingly, charging and/or recharging a battery pack after failure of a battery can cause failure of other batteries in the battery pack and can accordingly cause failure of the entire battery pack. As a result, there is a need for a battery system that permits cycling of the battery pack after failure of a battery.

SUMMARY

A method of operating a battery pack is disclosed. The battery pack has a plurality of parallel groups connected in series. Each parallel group includes a plurality of power sources connected in parallel. Each power source includes a battery. The method includes repeatedly charging the battery pack according to a charging protocol. The charging protocol is configured such that the voltage of any one battery in the battery pack does not exceed its maximum operational voltage after failure of a battery in the battery pack. The charging protocol can include charging the battery pack to a charged pack voltage. The charged pack voltage can remain the same after a battery fails as before the battery fails.

Another embodiment of the method includes repeatedly discharging the battery pack according to a charging protocol. The charging protocol is configured such that the voltage of any one battery in the battery pack does not fall below its minimum operational voltage after failure of a battery in the battery pack. The charging protocol can include discharging the battery pack to a discharged pack voltage. Discharging the battery pack to a discharged pack voltage can include or consist of stopping discharge of the battery pack when the pack voltage falls to the discharged pack voltage. The discharged pack voltage can remain the same after a battery fails as before the battery fails.

Another embodiment of the method includes repeatedly charging and discharging the battery pack according to a charging protocol. The charging protocol can be the same after a battery fails as before the battery fails. The charging protocol can be selected such that such that the voltage of any one battery in the battery pack does not exceed its maximum operational voltage after failure of a battery in the battery pack and such that the voltage of any one battery in the battery pack does not fall below its minimum operational voltage after failure of a battery in the battery pack. In some instances, the capacity discharged from each battery when discharging the battery pack from the charged pack voltage to the discharged pack voltage before failure of the battery is less than or equal to $C_m(M-1)/(M+1)$, where M is the number of power sources in each parallel group and $C_m$ is the maximum operational capacity of a battery.

A battery system is disclosed. The battery system includes electronics in electrical communication with the battery pack. The electronics can be configured to control and/or monitor the charging and/or discharging of the battery pack according to the disclosed methods.

DESCRIPTION

A battery system having electronics and a battery pack is disclosed. The electronics are configured to monitor and/or control the charge and/or the discharge of the battery pack. The battery pack includes a plurality of power sources that each includes a battery. The power sources are arranged in parallel groups that are connected in series. Each parallel group includes a plurality of power sources connected in parallel.

The electronics are configured to repeatedly charge and/or discharge the battery pack according to a charging protocol. The charging protocol is configured such that after failure of a battery in the battery pack, the voltage to which each of the batteries is charged is less than or equal to its maximum operational voltage and/or the voltage to which each of the batteries is discharged is greater than or equal to its minimum operational voltage. As a result, the failure of one of the batteries in the battery pack does not create a risk of failure of the batteries remaining in the battery pack.

Figure 1:
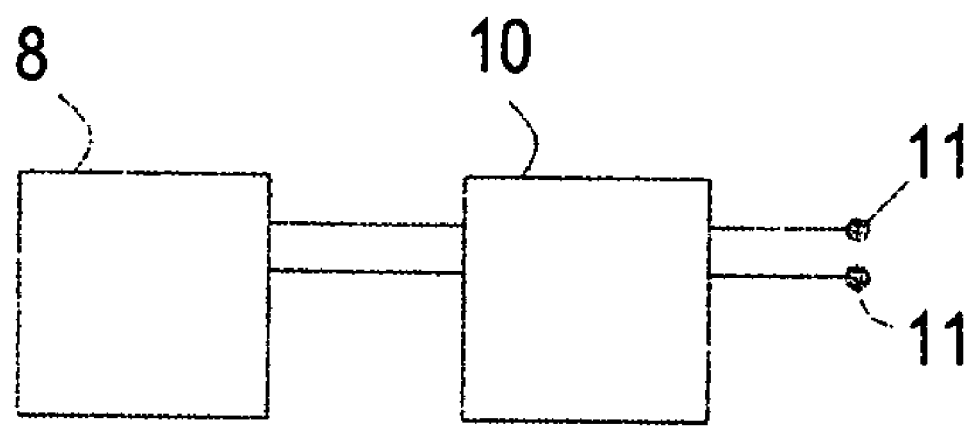
FIG. 1 is a schematic diagram of a battery system including electronics for controlling and/or monitoring the charging and/or discharging of a battery pack.

FIG. 1 provides a schematic illustration of a battery system. The battery system includes electronics 8 in electrical communication with a battery pack 10 and with the terminals 11 for the battery system. The electronics can be incorporated into the battery pack or can be external from the battery pack. The electronics are configured to control and/or monitor the discharge and charge of the battery pack. Suitable electronics include, but are not limited to, firmware, hardware and software or a combination thereof. Examples of suitable electronics include, but are not limited to, analog electrical circuits, digital electrical circuits, processors, microprocessors, digital signal processors (DSPs), computers, microcomputers, ASICs, and discrete electrical components, or combinations suitable for performing the required control functions. In some instances, the electronics include one or more memories and one or more processing units such as a CPU. The one or more memories can include instructions to be executed by the processing unit during performance of the control and monitoring functions. Although not illustrated, the electronics can include or be attachable to a power source that provides power for charging the battery pack.

Figure 2A:
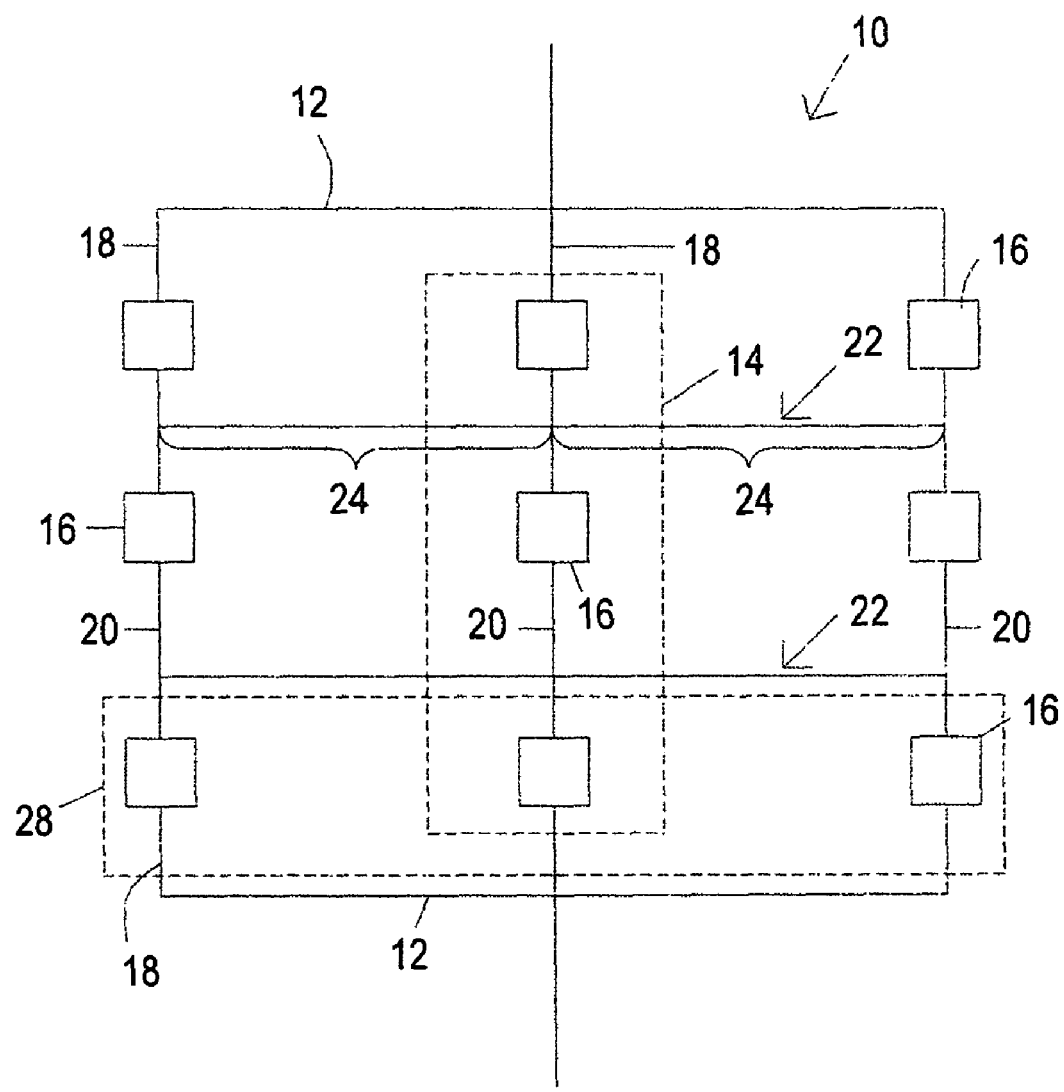
FIG. 2A is a schematic diagram of a battery pack. The battery pack includes a plurality of power sources arranged in parallel groups and series groups. Each parallel group includes a plurality of power sources connected in parallel. Each series group connects a power source from each of the parallel groups in series.

FIG. 2A provides a schematic diagram of the battery pack 10. The battery pack includes two primary parallel lines 12 that connect three series groups 14 in parallel. The series groups 14 each include three power sources 16 connected in series. Primary series lines 18 each provide electrical communication between a series group 14 and a primary parallel line 12 and secondary series lines 20 provide electrical communication between the power sources 16 connected in series.

The battery pack also includes a plurality of secondary parallel lines 22. The secondary parallel lines 22 each include one or more cross lines 24 that provide electrical communication between the secondary series lines 20 in different series groups 14. Accordingly, each secondary parallel line 22 provides a parallel connection between the power sources 16 in different series group 14. For instance, each secondary parallel line 22 provides electrical communication between different series groups 14 such that a power source 16 in one of the series groups 14 is connected in parallel with a power source 16 in the other series groups 14. Because a single secondary parallel line 22 only provides one of the parallel connections, another connection is needed to connect power sources 16 in parallel. The other parallel connection can be provided by another secondary parallel line 22 or by a primary parallel line 12. Each of the power sources 16 connected in parallel belongs to a parallel group 28. Accordingly, the battery pack of FIG. 2A includes three parallel groups 28.

Figure 2B:
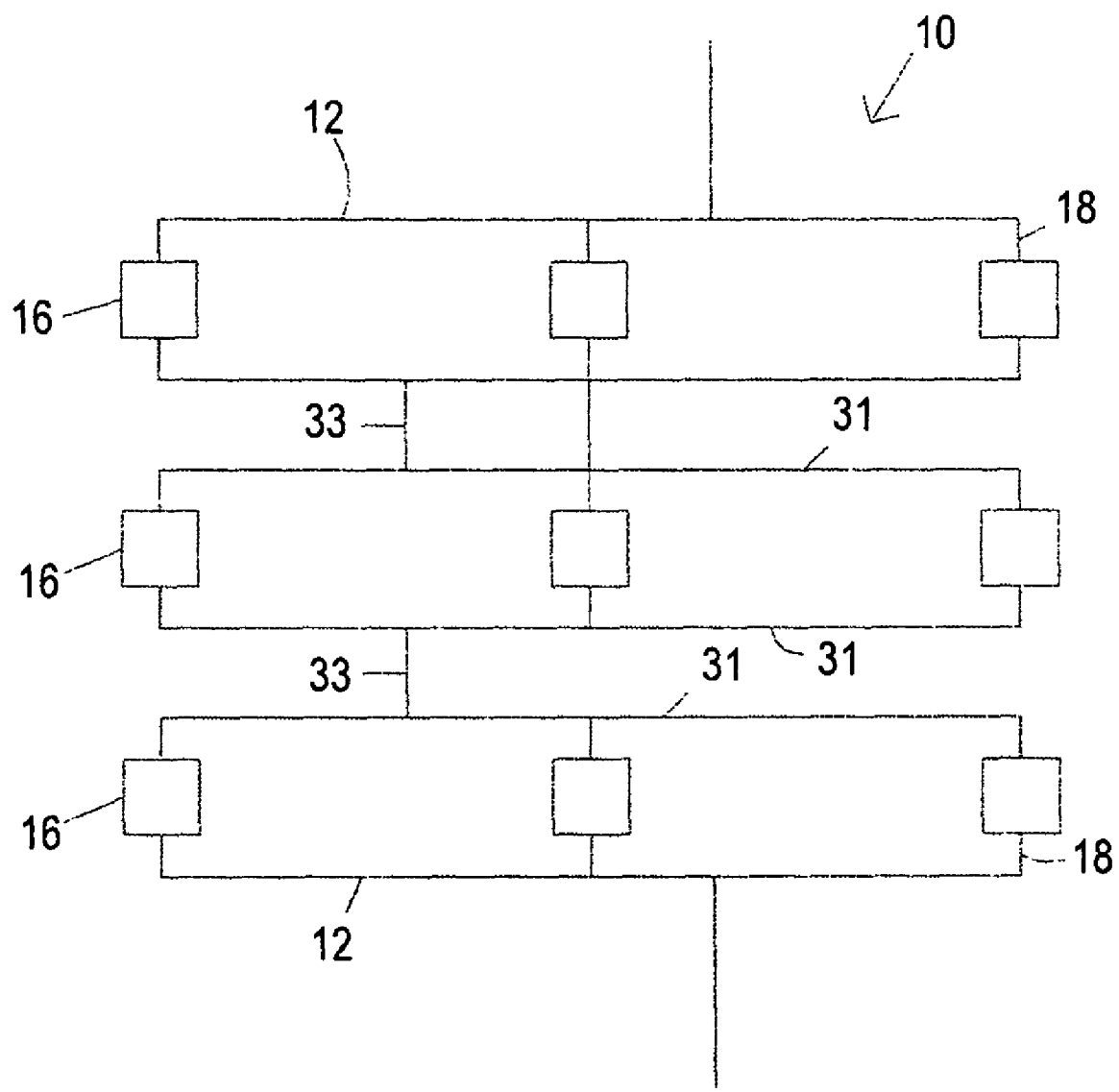
FIG. 2B is an alternate schematic for the batteries in the battery pack of FIG. 2A.

The battery pack of FIG. 2A can also be illustrated as a plurality of parallel groups connected in series as shown in FIG. 2B. In FIG. 2B, two parallel lines 31 connected by a series line 33 replace the secondary parallel lines of FIG. 2A. Accordingly, the battery pack excludes series groups. The schematic of FIG. 2A may be preferable because all of the pack current must pass through the series lines of FIG. 2B. As a result, the series lines may need to be larger than other lines in the battery pack and accordingly may add weight to the battery pack. For instance, when the battery pack is configured to provide large current levels, the series lines may each need to be a metal bar rather than a conventional conductor such as a wire.

The assembly illustrated in FIG. 2A and/or FIG. 2B can be scaled to include more power sources or fewer power sources. For instance, the system can include four or more power sources, twelve or more power sources, twenty-five or more power sources, eighty-one or more power sources, one hundred or more power sources. The number of power sources in each parallel group can be the same or different from the number of power sources in each series group 14. The number of power sources in each series group 14 can be increased in order to increase the voltage of the system or decreased in order to decrease the voltage of the system. Each series group 14 can include two or more power sources; four or more power sources; more than eight power sources; or fifteen or more power sources. The number of series groups 14 can be increased for applications that require higher power levels or decreased for applications that require lower power levels. In one embodiment, the battery pack includes only one parallel group and no series groups. The battery pack module can include two or more series groups; four or more series groups; ten or more series groups; or fifteen or more series groups 70. The battery pack can include two or more series groups 14; four or more series groups 14; ten or more series groups 14; or fifteen or more series groups 14.

The connections between the power sources can be standard methods for connecting power sources. The connections between the power sources and the conductors can be made using connection methods that are suitable for the amount of current and power that will be delivered by the battery. For instance, conductors can be connected to a power source by welding. Additionally or alternately, one or more of the primary parallel lines and the connected primary series lines can optionally be integrated into a single line. For instance, a single wire, cable, piece of sheet metal, or metal bar can serve as both a primary parallel line and as the connected primary series lines. Additionally or alternately, one or more the secondary parallel lines and the connected secondary series lines can optionally be integrated into a single line. For instance, a single wire, cable, piece of sheet metal, or metal bar can serve as both a secondary parallel line and as the connected secondary series lines.

Although FIG. 2A illustrates the secondary parallel lines 22 providing electrical communication between the series groups 14 such that a power source 16 in one of the series groups 14 is connected in parallel with a power source 16 in each of the other series groups 14, the secondary parallel lines 22 can provide electrical communication between the series groups 14 such that a power source 16 in one of the series groups 14 is connected in parallel with a power source 16 in a portion of the other series groups 14.

Although not illustrated in FIG. 2A and/or FIG. 2B, the battery pack can include other electrical connections between the primary parallel lines 12. For instance, other power sources and/or series groups can be connected between the primary parallel lines 12 but not otherwise electrically connected to the illustrated series groups. Further, the battery pack can include other components. For instance, the battery pack can include fuses positioned such that if a battery shorts, the battery is no longer in electrical communication with the rest of the batteries in the battery pack. Accordingly, the fuses can prevent a cell that shorts in a parallel group from shorting the other cells in the parallel group.

The battery pack can be configured to provide more than 9 V or more than 12 V. Additionally or alternatively, the battery packs can be configured to provide more than 50 watt-hours, more than 100 watt-hours or more than 240 watt-hours. Many of the advantages associated with the battery pack do not become evident until the battery pack is used for applications requiring high power levels. As a result, the battery pack is suitable for high power applications such as powering the movement of vehicles such as trucks, cars and carts. For these high power applications, the battery pack is preferably configured to provide more than 18 V, more than 24 V or more than 32 V. Additionally or alternatively, the battery pack is preferably configured to provide more than 240 watt-hours, more than 500 watt-hours or more than 1000 watt-hours. In some instances, the above performance levels are achieved using a battery pack where the batteries in the series groups 14 each have a voltage of less than 14 V, 10 V or 5 V. In some instances, the battery pack is configured to provide a maximum current greater than 30 A and includes two, three, or more than three series groups. In order to carry this level of current, the primary parallel lines 12 generally must be a metal bar rather than traditional connections such as wires. However, when the battery pack configuration of FIG. 2A is employed, the secondary balance lines 22 may not need to be metal bars as disclosed in Provisional Patent Application Ser. No. 60/601,285. These metal bars can be thick, expensive, and heavy. As a result, using conductors other than metal bars for the balance lines can reduce the costs, size and weight of the battery pack.

In some instances, one or more of the power sources are configured to provide more than 9 V or more than 12 V. Additionally or alternately, the power sources can be configured to provide more than 50 watt-hours, more than 100 watt-hours or more than 240 watt-hours. When the battery pack is used for applications requiring high power levels such as powering the movement of vehicles such as trucks, cars and carts, the power sources are preferably configured to provide more than 18 V, more than 24 V or more than 32 V. Additionally or alternately, the power sources are preferably configured to provide more than 240 watt-hours, more than 500 watt-hours or more than 1000 watt-hours.

Each of the power sources 16 includes one or more batteries. In some instances, one or more of the power source 16 includes a plurality of batteries connected in parallel and/or one or more of the power source 16 includes a plurality of batteries connected in series. The batteries are preferably each the same physical size but can be different sizes. In some instances, one or more of the power sources includes or consists of a battery pack. In some instances, each of the power sources includes or consists of a battery pack. In one example, the power sources each are each a battery pack having a plurality of pack parallel groups connected in series where each pack parallel group includes a plurality of batteries connected in parallel. Each battery pack can include electronics that charge and discharge the battery pack so as to survive failure of one or more batteries using the methods described herein. For instance, the battery pack of FIG. 2A or FIG. 2B can be constructed such that each power source 16 is also constructed according to FIG. 2A or FIG. 2B with a battery serving as the power source 16. With this construction, each of the power sources can optionally include electronics with all or a portion of the functions attributed to the electronics 8 of FIG. 1. When a plurality of the power sources are a battery pack, the battery packs are preferably each the same size but can be different sizes. A power source 16 or battery pack can include electrical components in addition to batteries. For instance, a power source 16 can include one or more resistors and one or more capacitors in addition to the one or more batteries. In a preferred embodiment, each of the power sources 16 consists of one or more batteries and the associated electrical connections.

Additional details about the construction and operation of battery packs, battery systems, batteries, and suitable electronics can be found in U.S. Provisional Patent Application Ser. No. 60/601,285; filed on Aug. 13, 2004; entitled "Battery Pack;" and in U.S. patent application Ser. No. 11/201,987; filed on Aug. 10, 2005; and entitled "Battery Pack;" and in U.S. Patent Application Ser. No. 60/707,500; filed on Aug. 10, 2005; and entitled "Battery System;" and in U.S. patent application Ser. No. (Not yet assigned); filed on Nov. 28, 2005; and entitled "Battery Pack System;" and in U.S. patent application Ser. No. (Not yet assigned); filed on Nov. 28, 2005; and entitled "Battery Pack System;" and in U.S. patent application Ser. No. 11/269,285; filed on Nov. 8, 2005; and entitled "Modular Battery Pack;" each of which is incorporated herein in its entirety. When possible, the functions of the electronics and/or controllers described in the above applications can be performed in addition to the functions described in this application. The teachings in these applications can be applied to the battery system, battery packs, batteries, electronics, and methods of operation disclosed in this application.

As noted above, the electronics of FIG. 1 are configured to monitor and/or control the charging and discharging of the battery pack. Each of the batteries has a maximum operational voltage above which it cannot be charged without subjecting the battery to failure. Additionally, each of the batteries has minimum operational voltage below which it cannot be charged without subjecting the battery to failure. The electronics can control the charging of the battery pack such that the voltage of any one cell does not exceed its maximum operational voltage after failure of a cell in the battery pack. Additionally or alternatively, the electronics can control the discharge of the battery pack such that the voltage of any one cell does not fall below exceed its minimum operational voltage after failure of a cell in the battery pack. As a result, a battery in the battery pack can fail without causing failure of the entire battery pack.

The electronics employ a charging protocol to recharge the battery pack to a charged pack voltage and/or to discharge the battery pack to a discharged pack voltage. The battery pack can be charged to the charged pack voltage using constant current, constant voltage, and combinations thereof and other suitable methods. The charging protocol can include other steps and/or functions. For instance, the electronics can include a temperature-measuring device and the electronics can stop or slow the charging of the battery pack in the event the temperature of the battery pack rises above a temperature threshold.

When the battery pack is charged to the charged pack voltage before a battery in the battery pack fails, each of the batteries is charged to a charged voltage before failure which may be the same or different for different batteries in the battery pack. After a battery has failed and the electronics use the same charging protocol to recharge the battery pack, each of the batteries is charged to a charged voltage after failure which may be the same or different for different batteries in the battery pack. For at least one battery in the battery pack, the charged voltage after failure is different from the charged voltage before failure. For instance, when the battery pack is constructed according to FIG. 2A and/or FIG. 2B, the failure of a battery in one of the parallel groups increases the portion of the charging current that flows through the batteries that remain in the parallel group with the failed battery. As a result, the batteries remaining in that parallel group will be charged to a higher voltage after failure than before the failure. Batteries having a charged voltage after failure that exceed their maximum operational voltage are subject to failure and accordingly subject the battery pack to failure.

The electronics can be configured to recharge the battery pack such that after failure of a battery, the battery pack can be recharged with the same recharging protocol without any one of the batteries having a charged voltage after failure that exceeds its maximum operational voltage. For instance, the charged pack voltage can be less than the maximum operational voltage of the battery pack. The maximum operational voltage of a battery pack is the voltage of the battery pack when each of the batteries is charged to its maximum operational voltage. For instance, a battery pack constructed according to FIG. 2A and/or FIG. 2B has a maximum operational voltage equal to the sum of the maximum operational voltage of each parallel group. As a further example, a battery pack constructed according to FIG. 2A and/or FIG. 2B with batteries that each have a maximum operational voltage of $V_m$ arranged in N parallel groups has a maximum operational voltage of $N*V_m$.

The charging protocol can also be configured such that the charged voltage after failure for each battery is less than its maximum operational voltage. For instance, the charging protocol employed by the electronics can be the same before the failure of a battery and after the failure of a battery but can be configured so the charged voltage after failure of each battery is less than or equal to the maximum operational voltage for each battery. As a result, charging the battery pack after the failure does not cause other batteries in the battery pack to fail.

When the battery pack is discharged to the discharged pack voltage before a battery in the battery pack fails, each of the batteries is discharged to a discharged voltage before failure which may be the same or different for different batteries in the battery pack. After a battery has failed and the electronics use the same charging protocol to discharge the battery pack, each of the batteries is discharged to a discharged voltage after failure which may be the same or different for different batteries in the battery pack. For at least one battery in the battery pack, the discharged voltage after failure is different from the discharged voltage before failure. For instance, when the battery pack is constructed according to FIG. 2A and/or FIG. 2B, the failure of a battery in one of the parallel groups increases the portion of the discharging current that flows from the batteries that remain in the parallel group with the failed battery. As a result, the batteries remaining in that parallel group may be discharged to a lower voltage after the failure than before the failure. Batteries having a discharged voltage after failure below their minimum operational voltage are subject to failure and accordingly subject the battery pack to failure.

The electronics can be configured to discharge the battery pack such that after failure of a battery, the battery pack can be discharged with the same charging protocol without any one of the batteries having a discharged voltage after failure that falls below its minimum operational voltage. For instance, the discharged pack voltage can be greater than or equal to the minimum operational voltage of the battery pack. The minimum operational voltage of a battery pack is the voltage of the battery pack when each of the batteries is discharged to its minimum operational voltage. For instance, a battery pack constructed according to FIG. 2A and/or FIG. 2B has a minimum operational voltage equal to the sum of the minimum operational voltage of each parallel group. As a further example, a battery pack constructed according to FIG. 2A and/or FIG. 2B with batteries that each have a minimum operational voltage of $V_{mi}$ arranged in N parallel groups has a minimum operational voltage of $N*V_{mi}$.

The charging protocol can also be configured such that the charged voltage after failure for each battery is less than its minimum operational voltage. For instance, the charging protocol employed by the electronics can be the same before the failure of a battery and after the failure of a battery but can be configured so the discharged voltage after failure of each battery is greater than or equal to the minimum operational voltage for each battery. As a result, discharging the battery pack after the failure does not cause other batteries in the battery pack to fail.

An example of a suitable charging protocol can be generated by identifying the maximum capacity range that the battery that remain intact in the battery pack may be required to provide after a battery in the battery pack fails. The circuitry of the battery pack can be employed to determine this maximum capacity range. When a battery pack is constructed according to FIG. 2A or FIG. 2B and a battery in a particular parallel group fails, the capacity that batteries in other parallel groups will be required to provide will remain substantially unchanged. However, the capacity requirements of the batteries in the same parallel group will increase by $\Delta C$, where: $\Delta C = C_f - C_o$; $C_f$ is the charge capacity that the intact battery has after failure of the other battery; and Co is the capacity that that intact battery had before the failure. An analysis of FIG. 2A and/or FIG. 2B shows that $C_f = C_o M/(M-1)$, where M is the number of series groups in the battery pack or M is the number of power sources in each parallel group. Accordingly, $\Delta C = C_o/(M-1)$. As a result, the additional capacity that will be required by each battery that remains in the parallel group is $C_o/(M-1)$.

Because a battery can fail at different points in the discharge/charge cycle of the battery pack, the additional capacity that is required of the batteries remaining intact in a parallel group, $\Delta C$, can also be required at different parts in the discharge/charge cycle. For instance, the total capacity values that will be required of the intact batteries will be different if the battery fails after charging than will be required if the battery fails after discharging. When cycling the battery pack charges and discharges a battery between a discharged capacity of $C_1$ and a charged capacity $C_2$ and another battery in the same parallel group fails after the battery pack is fully charged, discharging of the battery pack will decrease the capacity of the remaining intact battery to $C_1 - \Delta C$. This capacity can represent the minimum capacity value that the battery can reach after failure of a battery. When the same battery fails after discharging the battery pack, charging the battery pack will increase the remaining intact battery to $C_2 + \Delta C$. This capacity can represent the maximum capacity value that the battery can reach after failure of the battery. As a result, the range of capacity values for the remaining intact battery can be expressed as $(C_2 + \Delta C) - (C_1 - \Delta C)$. Because $C_2 - C_1 = Co$, the maximum capacity range for the remaining intact battery can be expressed as $C_o + 2\Delta C$ or as $C_o + 2C_o/(M-1)$.

Each battery is associated with a maximum operational capacity, $C_m$, which is the capacity discharged when discharging from its maximum operational voltage to its minimum operational voltage. To ensure that the batteries do not exceed their maximum operational capacity after the failure of a battery, the charging protocol is configured such that maximum capacity range for the remaining intact battery is less than the maximum operational capacity of the battery. This condition can be expressed as $C_o + 2C_o/(M-1) \leq C_m$. Accordingly, the charging protocol is configured such that $C_o \leq C_m(M-1)/(M+1)$. $C_o$ can be configured so as to be less than $C_m(M-1)/(M+1)$ to provide additional safety buffer.

Figure 3A:
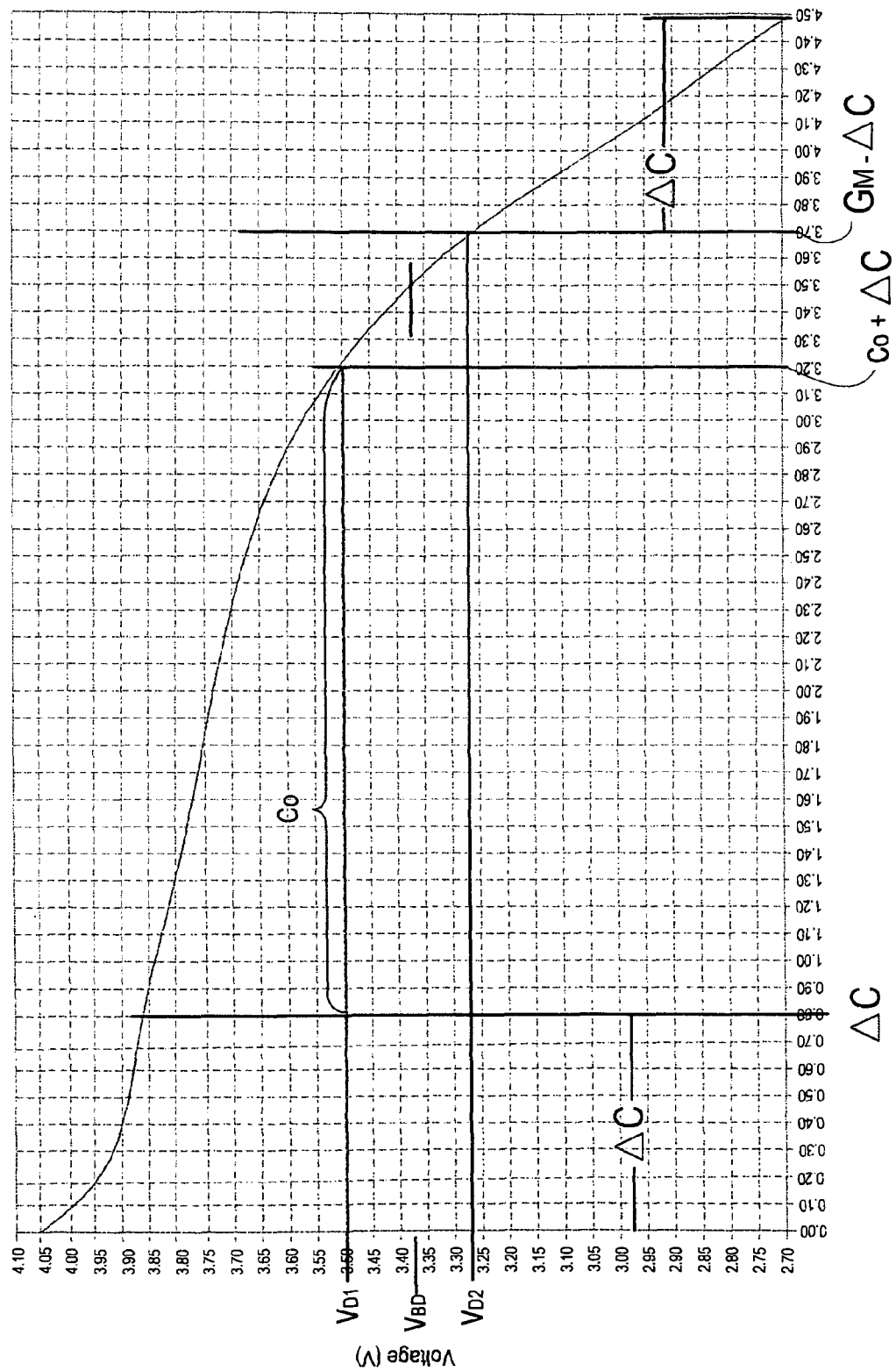
FIG. 3A illustrates a voltage versus charge capacity curve for a battery suitable for use in a battery pack according to FIG. 2A or FIG. 2B.

The $C_o$ value can be compared to data indicating voltage as a function of discharge capacity to determine a discharged pack capacity. FIG. 3A presents an example of this data for a SONY 18650 cell. The data is presented as a graph of voltage versus discharge capacity. These cells have a maximum operational voltage of 4.2 V, a minimum operational voltage of 2.7 V and a maximum operational capacity of 1.28 Ah when discharged from 4.2 V to 2.7 V when discharged at a rate of 1 C. The variables determined above are compared to FIG. 3A to identify a discharged battery voltage that allows a capacity buffer of $\Delta C$ on both sides of the $C_o$ value. For instance, as noted above, a battery must be capable of delivering additional capacity equal to $\Delta C$ both above and below the range of capacity values being provided by the battery before a different battery fails. The additional capacities of $\Delta C$ are marked in FIG. 3A. The maximum capacity that can be discharged while preserving the $\Delta C$ buffers above the range of capacity values is $C_m-\Delta C$. The voltage corresponding to $C_m-\Delta C$ is labeled $V_{D2}$ on FIG. 3A. The minimum capacity that can be discharged while preserving the $\Delta C$ buffers is $C_o+\Delta C$. The voltage corresponding to $C_o+\Delta C$ is labeled $V_{D1}$ on FIG. 3A. The battery can be discharged to a voltage between $V_{D1}$ and $V_{D2}$ while preserving the $\Delta C$ buffers each end of the capacity range. As a result, a value for the discharged voltage before failure, labeled $V_{BD}$, can be configured between $V_{D1}$ and $V_{D2}$. It may be preferable to select a discharged voltage before failure at about the average of $V_{D1}$ and $V_{D2}$ or associated with the average of ($C_m-\Delta C$ and $C_o+\Delta C$) in, order to provide additional buffer at both ends of the capacity spectrum. In instances where $C_o=C_m(M-1)/(M+1)$, $V_{D1}$ will be equal to $V_{D2}$ and the value for the battery voltage will equal $V_{D1}$. The discharged pack voltage for use in the charging protocol can be $N*V_{BD}$ where N is the number of parallel groups in the battery pack.

Figure 3B:
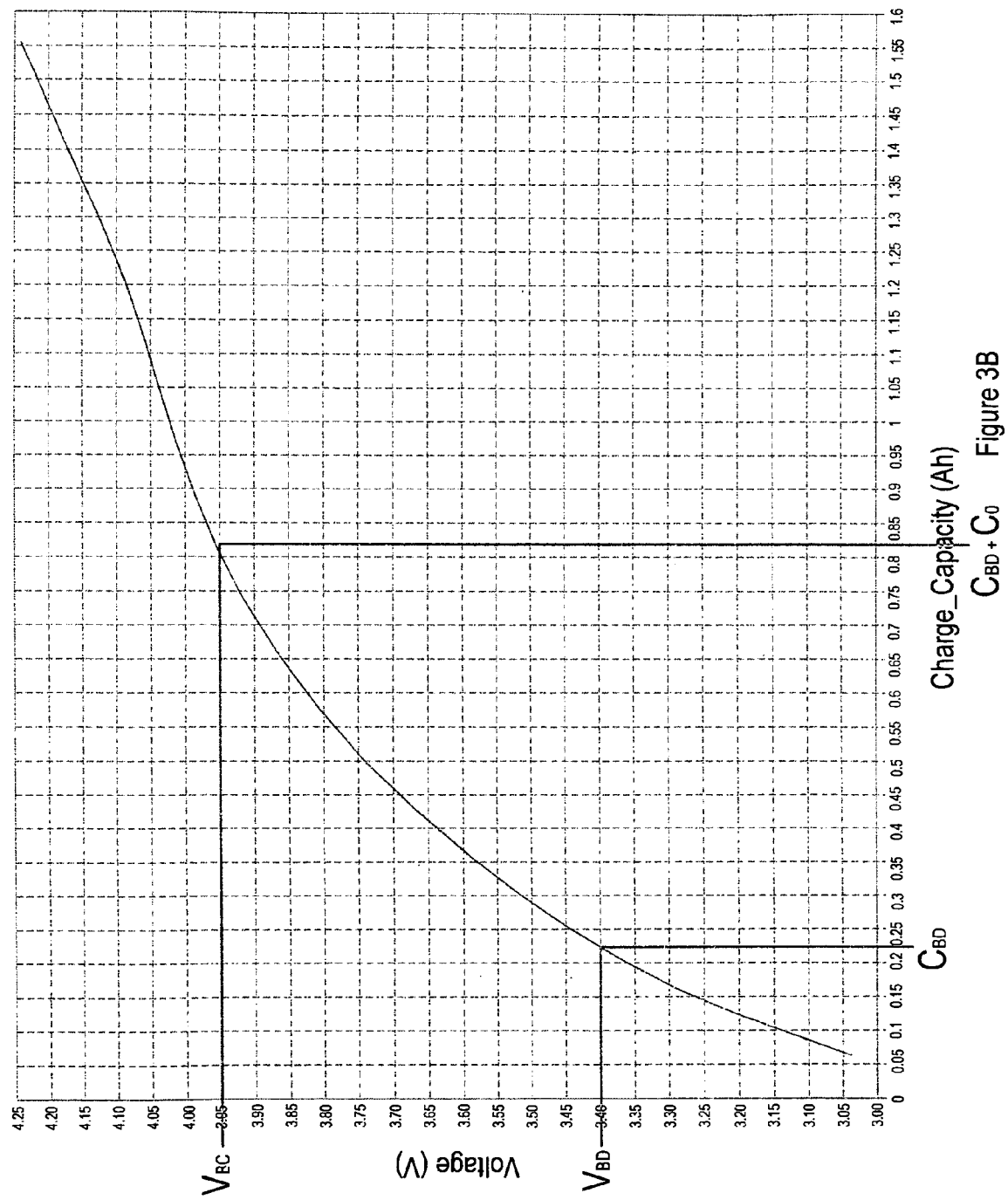
FIG. 3B illustrates a voltage versus charge capacity curve for a battery suitable for use in a battery pack according to FIG. 2A or FIG. 2B.

The $C_o$ value can be compared to data indicating voltage as a function of charge capacity to determine a charged pack capacity. FIG. 3B presents an example of this data for the same cells that were employed in FIG. 3A. The data is presented as a graph of voltage versus charge capacity. FIG. 3B was generated by using a constant current charge at 1.3 Ah. The increase in the battery capacity that results from charging is added to the battery discharge voltage is identified and compared to the data in order to identify a value for the charged battery voltage, $V_{BC}$. For instances, the charge capacity associated with the discharged voltage before failure, $V_{BD}$, is marked on FIG. 3B and labeled $C_{BD}$. The value of $V_{BD}+C_O$ is also marked on FIG. 3B. The voltage associated with the capacity $V_{BD}+C_O$ is identified and marked $V_{BC}$. This value of $V_{BC}$ can serve as the charged voltage before failure, $V_{BC}$. The charged pack voltage for use in the charging protocol can be $N*V_{BC}$ where N is the number of parallel groups in the battery pack. In some instances, the charging protocol includes charging the battery pack to the charged pack voltage represented by $N*V_{BC}$ and discharging the battery pack to the discharged pack voltage represented by $N*V_{BD}$.

The charging protocol presented above provides an advantage of low levels of capacity loss in the event that a battery does fail. Further, because $C_o \leq C_m(M-1)/(M+1)$, as noted above, the value of Co can approach Cm very quickly as the value of M increases. As a result, increasing the number of series groups quickly permits the value of Co to approach the maximum operational capacity of the batteries, $C_m$.

The maximum operational voltage for a battery can be function of the battery application. For instance, the maximum operational voltage generally decreases as the desired number of cycles increases. As a result, the maximum operational voltage is generally determined from the battery specification. In the absence of specifications, the maximum operational voltage is the voltage to which a battery can be charged while still providing the desired cycling performance. Additionally, the minimum operational voltage for a battery can be a function of the battery application. For instance, the minimum operational voltage generally increases as the desired number of cycles increases. As a result, the minimum operational voltage is generally determined from the battery specification. In the absence of specifications, the minimum operational voltage is the voltage to which a battery can be discharged while still providing the desired cycling performance.

Additional details about the construction, operation, and/or electronics of the battery pack and the battery system can be found in U.S. Provisional Patent Application Ser. No. 60/601,285; filed on Aug. 13, 2004; entitled "Battery Pack;" and in U.S. patent application Ser. No. 11/201,987; filed on Aug. 10, 2005; and entitled "Battery Pack;" and in U.S. Patent Application Ser. No. 60/707,500; filed on Aug. 10, 2005; and entitled "Battery System;" and in U.S. Provisional Patent Application Ser. No. 60/740,150; filed on Nov. 28, 2005; and entitled "Battery System Configured to Survive Failure of One or More Batteries;" and in U.S. Provisional Patent Application Ser. No. 60/740,202; filed on Nov. 28, 2005; and entitled "Battery Pack System;" and in U.S. patent application Ser. No. 11/269,285; filed on Nov. 8, 2005; and entitled "Modular Battery Pack;" and in U.S. Provisional U.S. Patent Application Ser. No. 60/740,204, filed on Nov. 28, 2005, entitled "Battery Pack System;" and in U.S. Provisional U.S. Patent Application Ser. No. 60/753,862, filed on Dec. 22, 2005, entitled " Battery Pack System;" and in U.S. Provisional Patent Application Ser. No. 60/819,421, filed on Jul. 6, 2006, entitled " Battery Pack System;" and in U.S. patent application Ser. No. 11/404,211, filed on Apr. 13, 2006, entitled "Battery Pack System;" and in U.S. patent application Ser. No. (not yet assigned), filed on Aug. 8, 2006, entitled " Battery System;" each of which is incorporated herein in its entirety. When possible, the functions of the electronics described in the above applications can be performed by the electronics of this application in addition to the functions described in this application. In some instances, the battery pack and/or the battery system are constructed as disclosed in the above applications and/or includes features described in the above application.

The battery pack disclosed in this Patent Application can be a battery pack system such as the battery pack system disclosed in U.S. Patent Application Ser. No. 60/819,421. The battery pack system disclosed in U.S. Provisional U.S. Patent Application Ser. No. 60/819,421 includes a plurality of battery packs. Each of the individual battery packs in the battery pack system can be operated as disclosed in this Patent Application.

The function of the electronics is described above in the context of discharging the battery pack to a discharged pack voltage. However, in many instances, the battery pack is charged before the battery pack reaches the discharged pack voltage. Accordingly, the electronics may be configured to stop the discharge of the battery pack in the event that the pack voltage falls below the discharged pack voltage. As a result the discharged pack voltage may serve as a threshold at which the electronics stop the discharge of the battery pack.

Although the above battery system is disclosed in the context of a battery pack where a single battery fails, the above principles can be extended to charging protocols for battery packs where multiple batteries fail.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A battery system, comprising:
   a battery pack having a plurality of parallel groups connected in series, each parallel group including a plurality of power sources connected in parallel, each power source including a battery; and
   electronics configured to discharge the battery pack according to a charging protocol, wherein
      the charging protocol includes repeatedly discharging the battery pack to a discharged pack voltage,
         the discharged pack voltage being the same before and after the failure of the battery, the charging protocol causing at least one of the batteries that has not failed to be discharged to a lower voltage after failure of the battery than that battery was discharged before the failure of the battery, and the charging protocol being configured such that the lower voltage to which each of the at least one batteries is discharged is greater than a minimum operational voltage of each one of the at least one batteries.

2. The system of claim 1, wherein the electronics are configured to discharge the battery pack with the same charging protocol before failure of the battery and after failure of the battery.

3. The system of claim 2, wherein the charging protocol includes discharging the battery pack to a discharged pack voltage, the discharged pack voltage being the same before and after the failure of the battery.

4. The system of claim 1, wherein each power source consists of a battery.

5. The system of claim 1, further comprising:
a plurality of series groups, each series group connecting in series at least one of the power sources from each of the parallel groups.

6. A method, comprising:
repeatedly discharging a battery pack according to a charging protocol the battery pack having a plurality of parallel groups connected in series, each parallel group including a plurality of power sources connected in parallel, each power source including a battery, wherein
the charging protocol includes repeatedly discharging the battery pack to a discharged pack voltage that is greater than a minimum operational voltage of the battery pack, the discharged pack voltage being the same before and after the failure of the battery,
the charging protocol causing at least one of the batteries that has not failed to be discharged to a lower voltage after failure of the battery than that battery was discharged before the failure of the battery,
the charging protocol being configured such that the lower voltage to which each of the at least one batteries is discharged is greater than a minimum operational voltage of each one of the at least one batteries.

7. The method of claim 6, wherein the discharged pack voltage is greater than a minimum operational voltage of the battery pack.

8. The method of claim 6, wherein the charging protocol is executed by electronics.

9. The method of claim 6, wherein the same charging protocol is employed before failure of the battery and after failure of the battery.

10. The method of claim 6, wherein each power source consists of a battery.

11. The method of claim 6, wherein the charging protocol includes charging the battery pack to a charged pack voltage, the charged pack voltage being the same before and after the failure of the battery.

12. The system of claim 1, wherein the discharged pack voltage is greater than a minimum operational voltage of the battery pack.

13. The system of claim 1, wherein the charging protocol includes charging the battery pack to a charged pack voltage, the charged pack voltage being the same before and after the failure of the battery.

14. The system of claim 13, wherein the capacity discharged from each battery when discharging from the charged pack voltage to the discharged pack voltage before failure of the battery is less than or equal to $C_m(M-1)/(M+1)$, where M is the number of power sources in each parallel group and $C_m$ is the maximum operational capacity of a battery.

15. The system of claim 1, wherein the charging protocol charges the battery pack such that the voltage of any one battery in the battery pack does not rise above its maximum operational voltage after failure of a battery in the battery pack.

16. The system of claim 1, wherein the charging protocol includes charging the battery pack to a charged pack voltage that is less than a maximum operational voltage of the battery pack.

17. The system of claim 1, further comprising:
a plurality of series groups, each series group connecting in series at least one of the power sources from each of the parallel groups.

* * * * *